United States Patent [19]
Griffin

[11] Patent Number: 4,667,549
[45] Date of Patent: May 26, 1987

[54] CENTERING DEVICE AND METHOD

[76] Inventor: William J. Griffin, P.O. Box 26, Walker Springs, Ala. 36586

[21] Appl. No.: 847,216

[22] Filed: Apr. 2, 1986

Related U.S. Application Data

[62] Division of Ser. No. 699,439, Feb. 7, 1985.

[51] Int. Cl.⁴ .................. B23B 23/02; B23B 33/00
[52] U.S. Cl. ........................... 82/40 R; 82/45; 142/53
[58] Field of Search ............ 82/40 R, 45; 144/209 R; 142/53

[56] References Cited

U.S. PATENT DOCUMENTS

| | | | |
|---|---|---|---|
| 891,602 | 6/1908 | De Marey | 142/53 |
| 1,198,030 | 9/1916 | Helgerud | 82/33 R |
| 2,337,727 | 12/1943 | Sandelin, Jr. | 82/40 R |
| 2,879,816 | 3/1959 | Cook et al. | 144/209 R |
| 4,342,348 | 8/1982 | Lichtenwalter et al. | 142/53 |

Primary Examiner—Leonidas Vlachos
Attorney, Agent, or Firm—Nies, Webner, Kurz & Bergert

[57] ABSTRACT

An improved apparatus and method for locating the center of the ends of wood stock for use such as in a wood turning operation. The apparatus includes an adjustable fence and stop member, with the apparatus adapted to be mounted on a band saw or other machine tool. An additional feature includes improved adapters for use with a live lathe center in a wood turning operation. The present invention results in safer operation and also provides a substantial reduction in the time and labor required to center the ends of a piece of wood stock.

5 Claims, 15 Drawing Figures

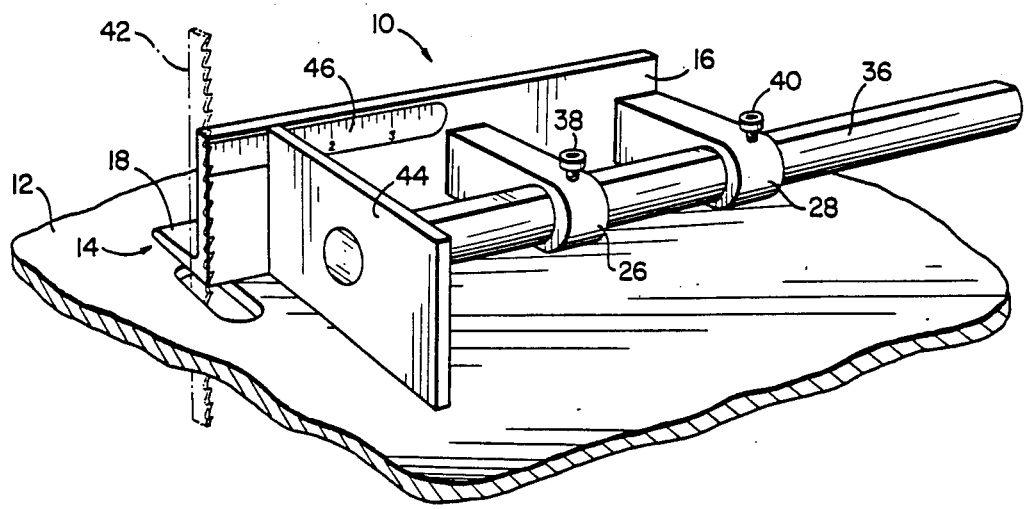
FIG. 1
FIG. 2
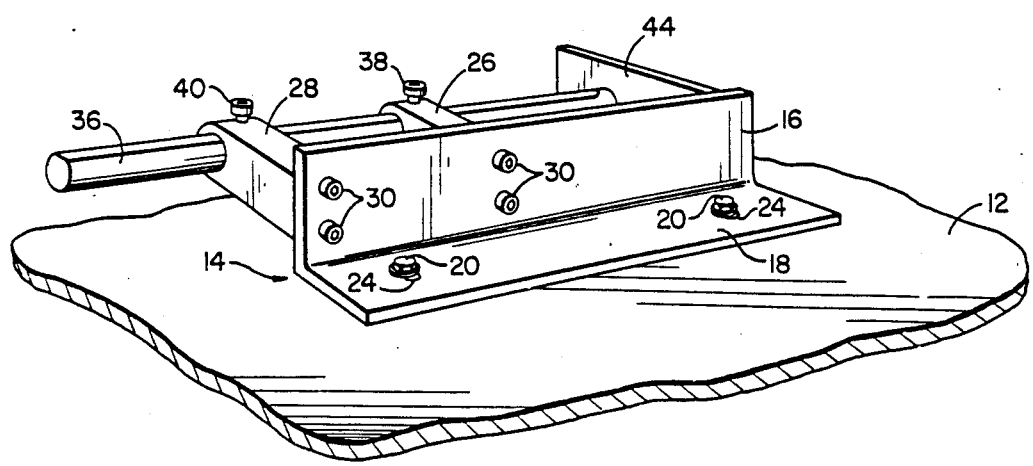

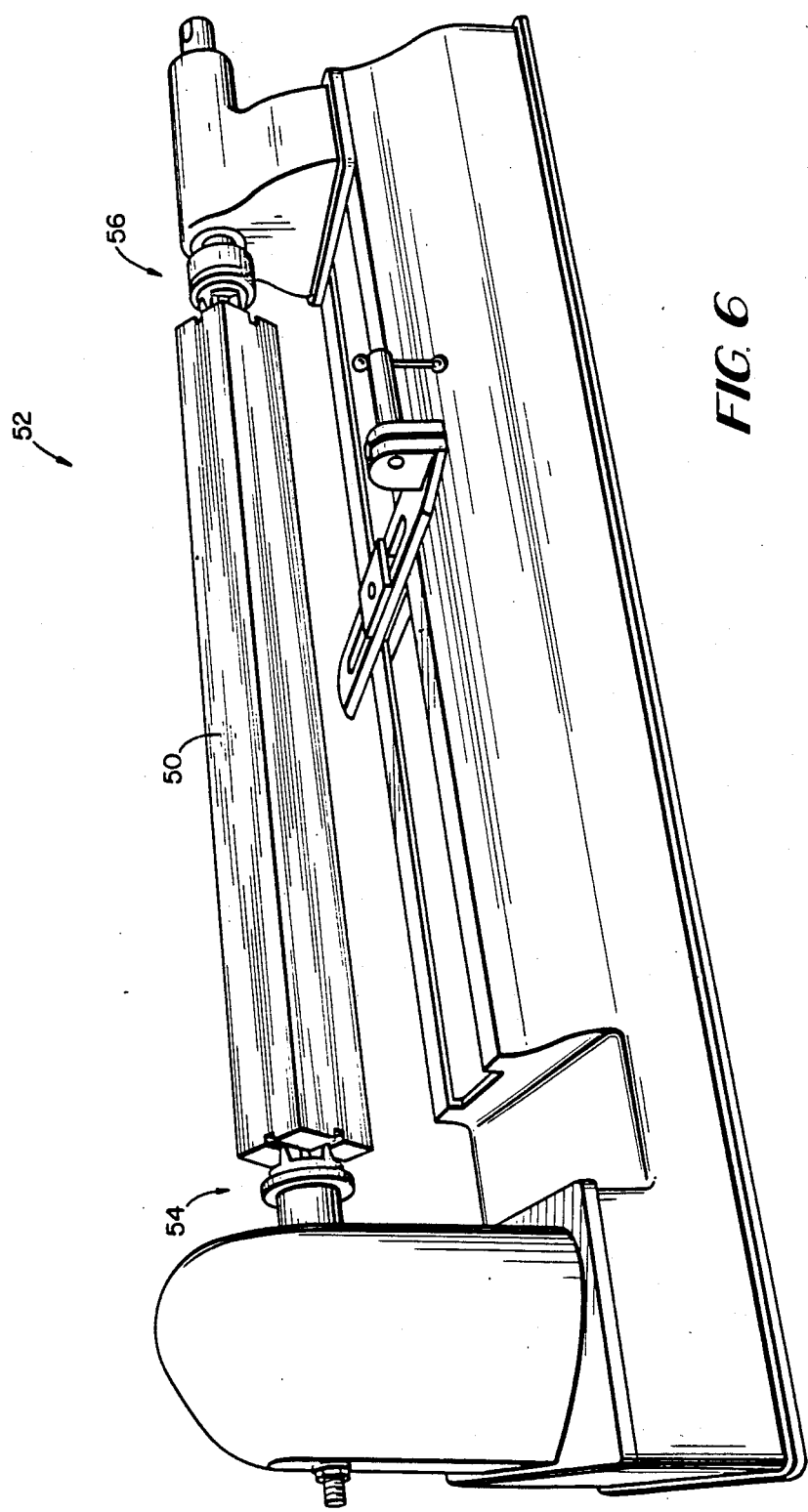

CENTERING DEVICE AND METHOD

This is a division of application Ser. No. 699,439 filed Feb. 7, 1985.

BACKGROUND AND SUMMARY OF THE INVENTION

This invention relates to a centering device for wood lathe stock. More particularly, the present invention relates to a centering device and method which provide for automatic centering of wood lathe stock as the stock is sawn from opposite sides. Safety features are provided since the wood member is firmly held in crossed slots on each end. The present invention is a substantial labor saving device, sharply reducing the time required for centering the ends of a piece of wood stock. In use, the present centering device is normally mounted on a band saw or other machine tool.

In previous standard wood lathe practice of making a cross mark on the ends of wood stock from corner to corner and then center punching, either with a punch or an awl, problems have arisen in properly marking the center of the stock due to the particular structure of the end grain of the wood which can deflect the tool and result in the point marked as center being off-center. In addition, an inordinate amount of time has been required in locating the center of the ends of wood stock by the use of previous methods.

Previous wood working devices having an adjustable fence or a combination of a fence and stop member are described in the following U.S. Pat. Nos. 836,006 to Bemis; 2,064,607 to Hirtz; 2,119,353 to Reimer; 2,696,854 to Woodruff; and 4,454,793 to Strong.

By the present invention there is provided an improved apparatus and method for locating the center of the ends of wood stock for use such as in a wood turning operation. The apparatus includes an adjustable fence with stop member mounted on a band saw or other machine tool. The method of the invention employs the adjustable fence and stop member along with a wood lathe.

An additional aspect of the invention includes providing adapters for a live lathe center. Use of the improved adapters results in safer operation, particularly when working with soft wood, and also reduces the time required for the wood turning operation.

BRIEF DESCRIPTION OF THE DRAWINGS

FIG. 1 is a front perspective view of the centering device for wood lathe stock of the present invention.

FIG. 2 is a rear perspective view of the centering device shown in FIG. 1.

FIG. 6 is a perspective view showing an item of wood stock mounted in a lathe in accordance with the present invention.

DESCRIPTION OF THE PREFERRED EMBODIMENTS

Figure 3:
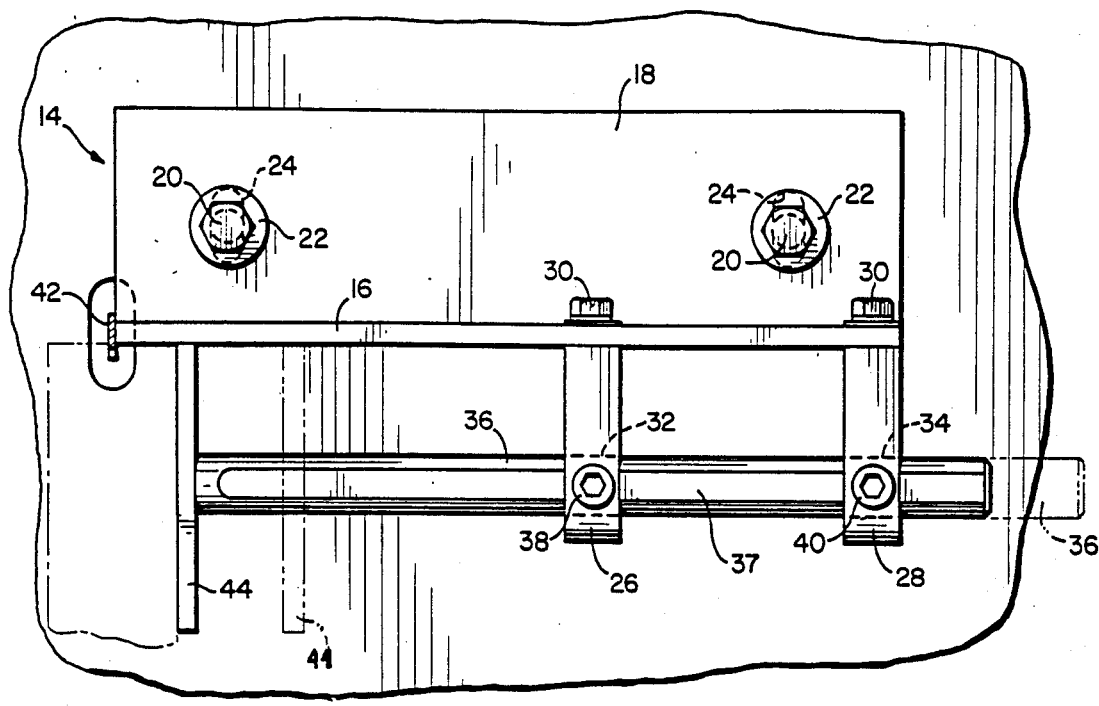
FIG. 3 is a top plan view of the centering device of FIG. 1.
Figure 4:
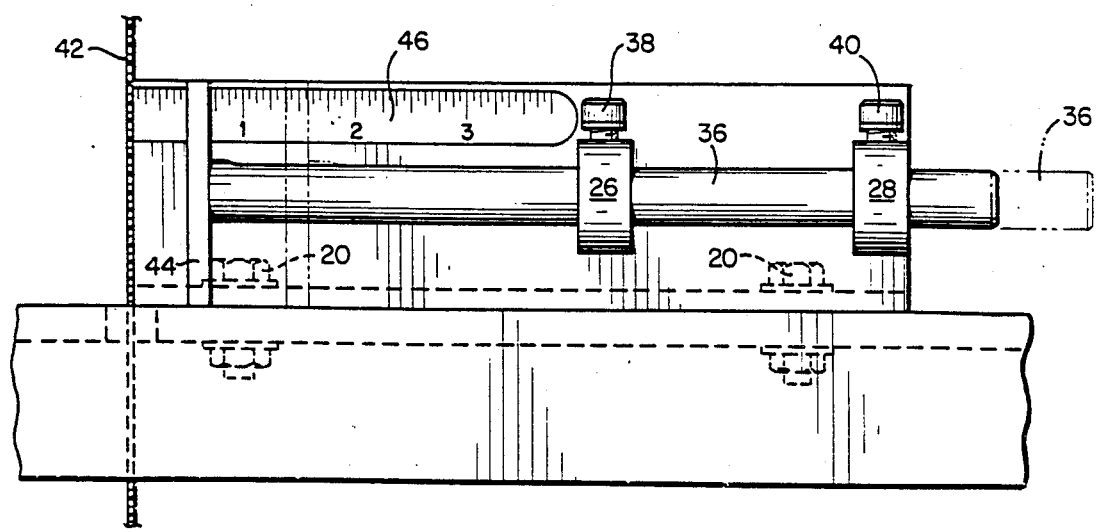
FIG. 4 is a side elevation of the centering device of FIG. 1.

In the embodiment of the invention as shown in FIGS. 1-6, there is provided a centering device 10 for wood lathe stock, shown mounted on a band saw table 12. The centering device 10 includes a stop 14 in the form of a longitudinally extending main base member formed of vertical 16 and horizontal 18 planar portions attached along their longitudinal edges at right angles to form an L-shaped cross-section. The horizontal planar portion 18 is secured to the band saw table 12 by means such as a pair of hexagonal head cap screws 20 and washers 22, with each screw 20 extending through a respective transverse slotted hole 24 in planar portion 18. The slots 24 allow the stop 14 to be adjusted after installation to provide various saw depths.

Attached at right angles to the vertical planar portion 16 of the stop 14 by socket head cap screws 30 or similar means are a pair of stop brackets 26, 28. The stop brackets 26, 28 have mutually aligned transverse bores 32, 34 in the outer ends for receiving a rod member 36. Socket head cap screws 38, 40 are received in the outer end of each bracket 26, 28 so as to engage the flattened upper surface 37 of rod member 36, for use in adjusting the position of the rod 36 relative to the saw blade 42.

Mounted perpendicularly at the end of the rod 36 in proximity to the saw blade 42 is a flat plate member 44 which, together with the rod 36, forms an adjustable fence extending in a direction parallel to the longitudinal axis of the stop 14. In one embodiment, the rod 36 may be formed of a steel rod having a diameter of about ½ inch, with the plate 44 formed of a rectangular steel plate, of thickness about 3/16 inch, having a width of about 3½ inches and a height of about 2 inches. As shown in FIGS. 1-3, the lower edge of plate 44 is contiguous with the table 12 and the inner vertical edge of plate 44 is contiguous with the vertical portion 16 of stop 14.

On the inner face of vertical base portion 16, adjacent the end thereof nearest the saw blade 42, there is provided a scale 46 of inches for determining the position of the plate 44 relative to the saw blade 42. As shown in FIG. 3, the stop 14 is located so as to be immediately adjacent the saw blade 42, thus allowing the scale 46 to accurately represent the distance from the saw blade 42 at right angles thereto.

In the use of the centering device 10 of the present invention, the adjustable fence may, for example, be set on 1″ from the saw blade 42, using the scale 46. Utilizing the slots 24 in the horizontal base portion 18, the depth of cut can be adjusted by positioning the device 10 so that the teeth of the saw blade 42 are set approximately 3/16″ in front of vertical base portion 16. This will allow the wood stock to be cut to that depth before coming to rest against the stop 14. Since the band saw cuts a slot width of 1/16″, this means that a piece of wood stock 2"×2" on the end will have a 1/16" slot 3/16" deep a distance of 15/16" from the edge which is away from the fence and 1" from the edge next to the fence. This initial cut may be off-center to either the right or left. The 2×2 stock may then be turned over (180°) and carefully sawn again. This time the band saw removes 1/16" of stock to a depth of 3/16" on the 1" side only. Now there is provided a slot ⅛" in width 3/16" deep 15/16" from each edge of the stock.

Thus the present device 10 provides for the automatic centering of the slot as the stock is sawn from opposite sides. Now the same operation must be carried out 90° from where the cut was made previously. When this is done the result will be two ⅛" slots crossing each other exactly centered on the end of the 2×2 piece of stock 50 as shown in the left portion of FIG. 5. At this point the ends of the stock are exchanged and the same operation is performed on the other end. When this step is completed, the stock 50 may then be positioned in the lathe 52 as shown in FIG. 6.

The head end 54 of the lathe 52 with the centering 60° point and driving cross spur fits into the intersection of the ⅛" slots. The 60° point contacts the slots on the corners before it reaches the bottom of the slots, centering the stock 50 perfectly and the cross spur fits into the ⅛" cross slots perfectly. When the head end 54 is complete, the tail stock center point is then positioned in the crossed slots on the tail end 56. Now the tail stock is tightened to the lathe bed, then the center point is screwed in on the tail center until ⅛" to 3/16" penetration is obtained on the head end 54 and tail end 56 of the wood stock 50 as shown in the right portion of FIG. 5. Thus there is achieved an automatic centering effect on each end of the wood stock as the points on each end of the lathe 52 penetrate the wood guided against the ⅛" slot crossed corners. In addition, since the wood stock is firmly held in the ⅛"×3/16" crossed slots on each end, safety of operation is improved many times over. Also, with the wood stock being centered accurately, vibration is decreased and safety is improved.

Figure 5:
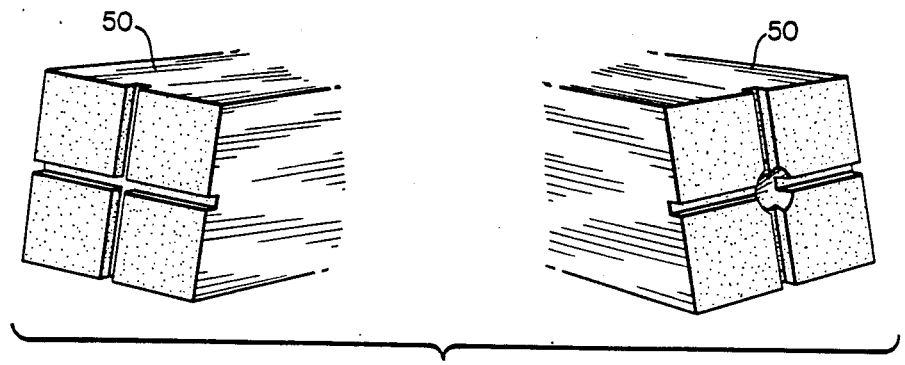
FIG. 5 shows perspective end views of a portion of wood stock which has been sawn in accordance with the present invention.

In previous standard wood lathe practice of making a cross mark form corner to corner and then center punching, either with a punch or an awl, it has been found that the hard grain on the ends of the wood stock frequently deflects the tool and causes the marked center to be actually off-center. With the present device this problem is eliminated, as shown in FIG. 5, with all four sections being the same size. The time required for preparing 100 ends as shown in FIG. 5 is approximately 8 minutes by the present invention. The old system for preparing 100 ends requires approximately 4 to 5 hours. This represents a saving in labor of approximately 3,000%. The reason for such a large saving of labor is that all operations using standard practice are eliminated. Using the present invention, the wood stock is positioned, centered and made to be more safe and ready for the lathe in one operation of cross cutting, as described herein.

The cross slots as shown in FIG. 5 can be cut to various depths and widths to accommodate different types of driving spurs and tail centers since some manufacturers may use different angle points and the like. When the standard dead tail center is used the slots serve not only for centering the stock, but also to hold a reserve of lubrication which reduces the heat being generated and reduces friction.

The centering device 10 of the present invention is easily mounted on any band saw table 12. As shown in FIGS. 1-4, the device 10 is squared to the band saw table 12. The two mounting holes are marked after the saw teeth are set approximately 3/16" ahead of the stop as shown in FIGS. 1 and 3. The embodiment as described will accommodate wood stock having dimensions at least up to 7"×7".

In the use of the centering device 10, if one has turned table legs which are round at places and other places which are square, the square sides are equal across the side every time when using the present device 10. Often when standard practice is used, the across-the-square sides will be unequal. Equal sides as well as equal relative depths from sides to outer edges of the round sections are obtained by use of the centering device 10 of the present invention.

Figure 7A:
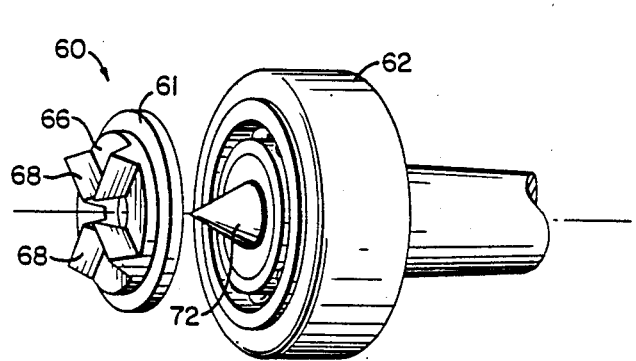
FIGS. 7A and 7B show perspective views of a first embodiment of an adapter for a wood lathe live tail center, in accordance with the present invention.
Figure 7B:
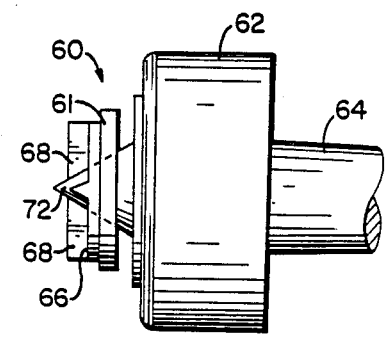
Figure 8:
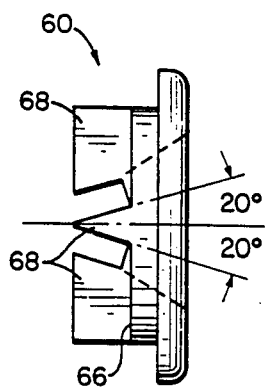
FIG. 8 is a side elevation of the adapter of FIG. 7.
Figure 9:
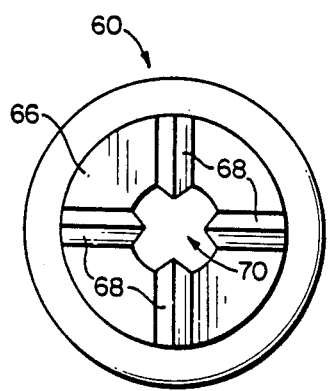
FIG. 9 is a front elevation of the adapter of FIG. 7.

In FIGS. 7-9 there is shown an adapter 60 for a live tail center, for use with a lathe in wood cutting or shaping operations, in accordance with the present invention. The adapter 60 forms the outer end configuration for a standard live ball or roller bearing tail center 62, with the inner portion 64 thereof being tapered in a conventional manner to fit the wood lathe tail stock.

The adapter 60 includes a plate member 61 having a flat disc-shaped member 66 mounted thereon, and with four drive dogs 68 mounted on disc 66 at intervals 90 degrees apart and extending radially outwardly. A central opening or bore 70 is provided in the adapter 60 to receive the outer portion 72 of the tail center 62. In one embodiment, the bore 70 has a 60° morse taper, the diameter of plate 61 is approximately 1 inch and the overall width of the adapter 60 is approximately ⅜ inch. In this embodiment the taper of the drive dogs 68 is about 20° on each side of the axis centerline as shown in FIG. 8. The drive dogs 68 may have a top edge surface of approximately 1/32 inch across the width thereof. Other dimensions may be employed to accommodate a particular lathe. As shown in the drawings, the adapter 60 is placed over the outer conical portion 72 of the tail center 62 prior to engaging the tail center 62 with the wood stock. The inner portions of the drive dogs 68 are cut away as necessary to accommodate portion 72 of the tail center 62.

Figure 10:
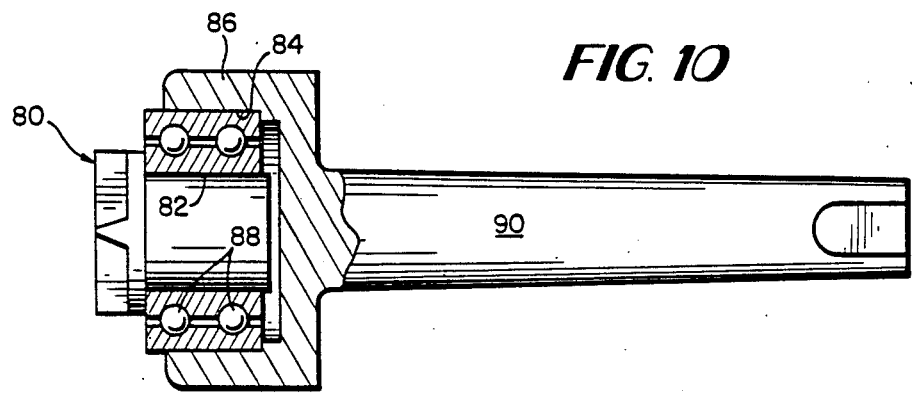
FIG. 10 is a perspective view in partial cross-section of a second embodiment of an adapter for a wood lathe live tail center.
Figure 11:
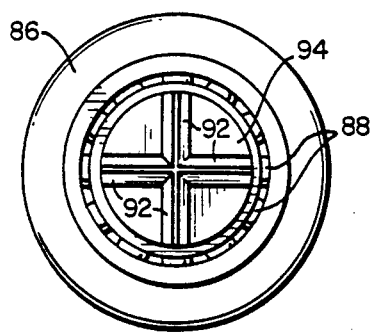
FIG. 11 is an outer end view of the adapter of FIG. 10.
Figure 12:
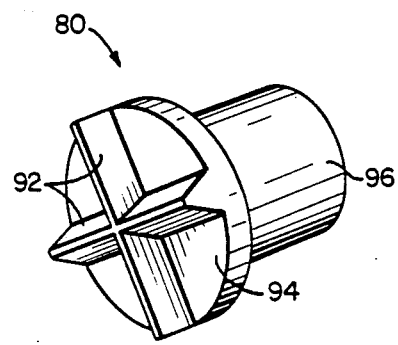
FIG. 12 is a perspective view of the adapter of FIG. 10.

In FIGS. 10-12 there is shown a second embodiment of an adapter for a live tail center, this being an integral adapter 80. In this embodiment, the adapter 80 is inserted in friction fitting engagement within the inner race portion 82 of the inner 82 and outer 84 bearing races within an otherwise standard live center 86. In this regard, standard ball or roller bearings 88 are employed as typical in standard live centers. The inner shaft portion 90 of the live center 86 may be tapered in a conventional manner to fit the wood lathe tail stock.

The integral adapter 80 has the drive dogs 92 positioned similarly to the adapter 60, being positioned at 90° intervals on disc member 94. The taper of the drive dogs 92 may be the same as for adapter 60 and the diameter of the inner cylindrical shaft portion 96 of the adapter 80 will depend on the size of the particular live tail center. In one embodiment the overall length of adapter 80 is about 1 1/16 inch with the diameter of the disc 94 being approximately 1 inch. In this embodiment, as in the case of the adapter 60, the height of the drive dogs is about 3/16 inch. The top edge surface of the drive dogs 92 is about 1/32 inch across.

Figure 13:
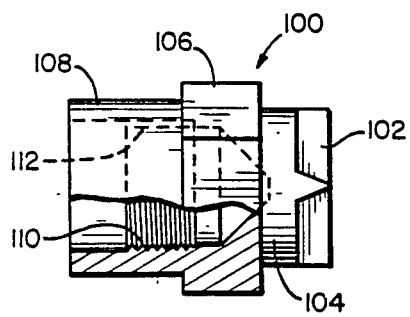
FIG. 13 is a side elevation of a drive spur employed on the lathe drive end in accordance with the present invention.
Figure 14:
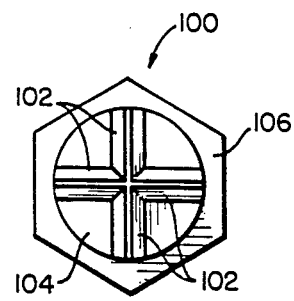
FIG. 14 is an end view of the drive spur of FIG. 13.

In FIGS. 13 and 14 there is shown a drive spur device 100 which may be employed on the drive end of the lathe, when using either the adapter 60 or 80 on the tail support end. The drive spur 100 includes drive dogs 102 mounted at 90° intervals on disc member 104 which is secured to the outer hexagonal shaped collar portion 106 of cylinder member 108. A threaded bore 110 is provided in member 108 for use in removably securing the drive spur 100 to the drive end 112 of the lathe.

The drive dogs 102 may be formed so as to have the same general configuration as the dogs of adapters 60 and 80. In one embodiment the overall length of the drive spur 100 is about 1 11/16 inches and the diameter of the cylindrical member 108 is about 1⅛ inches. Due to the fact that the head and tail configurations are basically the same, it is possible to change ends during sanding operations in order to effect direction rotation change. Such a procedure is very helpful in obtaining a smooth finished surface on the wood stock.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letter Patent is:

1. An integral adapter for fitting within the inner race portion of a live lathe tail center having a bearing race in the outer end thereof, for use with wood stock having at least one end portion prepared with cross slots which extend across said end portion at 90 degrees relative to each other, comprising: a flat disc member having a plurality of drive dogs mounted on one side thereof at 90 degree intervals and extending radially outwardly along said disc, and a cylindrical shaft member secured to the opposite side of said disc from said drive dogs, said shaft member being adapted to fit within the inner bearing race, each of said drive dogs being tapered inwardly from the position of attachment to the disc member to the outer edge thereof about a vertical plane extending through the radial axis of each drive dog, said drive dogs being provided at 90 degree intervals on said disc member for engagement with said cross slots and with each drive dog extending from the radial center of said disc member to the outer edge thereof so that the outer tip portion of any one drive dog is continuous with the outer tip portion of the drive dog positioned 180 degrees away from said any one drive dog on the opposite side from the center of said disc member, the surface of said disc member between adjacent drive dogs being generally flat so that said drive dogs provide the outermost contact of said adapter with said wood stock.

2. A drive spur for use on the drive end of a lathe, to be used with wood stock having at least one end portion prepared with cross slots which extend across said end portion at 90 degrees relative to each other, comprising:
a flat disc member having a plurality of drive dogs mounted on one side thereof at 90 degree intervals and extending radially outwardly along said disc, and a cylindrical member secured to the opposite side of said disc from said drive dogs, said cylindrical member having means for attaching said drive spur to the drive end of the lathe, each of said drive dogs being tapered inwardly from the position of attachment to the disc member to the outer edge thereof about a vertical plane extending through the radial axis of each drive dog, said drive dogs being provided at 90 degree intervals on said disc member for engagement with said cross slots and with each drive dog extending from the radial center of said disc member to the outer edge thereof so that the outer tip portion of any one drive dog is continuous with the outer tip portion of the drive dog positioned 180 degrees away from said any one drive dog on the opposite side from the center of said disc member, the surface of said disc member between adjacent drive dogs being generally flat so that said drive dogs provide the outermost contact of said drive spur with said wood stock.

3. The drive spur of claim 2 wherein said cylindrical member has a collar portion at the end thereof to which the disc is attached.

4. The integral adapter of claim 1 wherein the outer edge surface of each drive dog is flattened with the top edge surface being about 1/32 inch in width.

5. The drive spur of claim 2 wherein the outer edge surface of each drive dog is flattened with the top edge surface being about 1/32 inch in width.

* * * * *